United States Patent [19]
Bancroft et al.

[11] 4,344,525
[45] Aug. 17, 1982

[54] SCRAPER DEVICE

[75] Inventors: John Bancroft, Blackburn; John L. Greenhalgh, Accrington; Ronald Smith, Oswaldtwistle, all of England

[73] Assignee: J. H. Fenner & Co. Ltd., Hull, England

[21] Appl. No.: 177,551

[22] Filed: Aug. 13, 1980

[30] Foreign Application Priority Data

Aug. 15, 1979 [GB] United Kingdom ............... 7928410

[51] Int. Cl.³ .......................................... B65G 45/00
[52] U.S. Cl. ................................. 198/499; 198/497
[58] Field of Search .............. 198/497, 498, 499, 637; 15/256.5; 474/92; 403/2, DIG. 3

[56] References Cited
U.S. PATENT DOCUMENTS

| 3,504,786 | 4/1970 | Matson | 198/499 |
| 3,674,131 | 7/1972 | Matson | 198/497 X |
| 3,994,385 | 11/1976 | Reiter | 198/499 |
| 4,249,650 | 2/1981 | Stamura | 198/499 |

Primary Examiner—Jeffrey V. Nase
Attorney, Agent, or Firm—Sughrue, Mion, Zinn, Macpeak and Seas

[57] ABSTRACT

A scraper device for a belt conveyor has an elongate scraper blade for extending the width of the belt conveyor and carried by a support unit mounted on a supporting framework. The support unit includes an elongate bar engaged at each end in a ring rotatably supported in a slide block resiliently slidable in a U-bracket of the supporting framework. An axial shear pin traverses the slide block and ring to resist relative rotation therebetween until excessive torque is applied to the blade.

14 Claims, 10 Drawing Figures

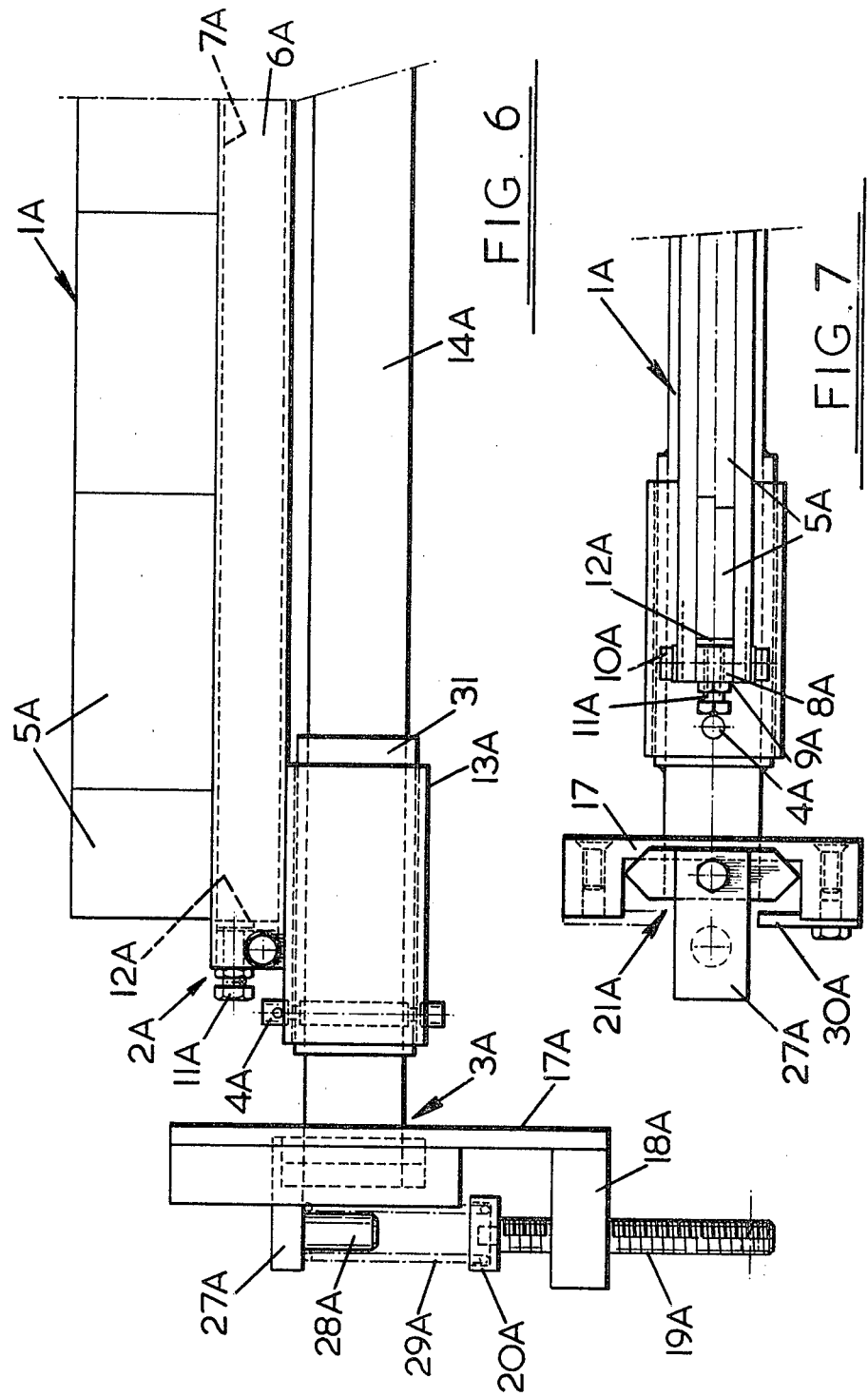

SCRAPER DEVICE

The present invention relates to a scraper device for a belt or like conveyor.

Conveyor scraper devices are used for removing debris or other matter from conveyor surfaces and operate most efficiently when applied at a position where the conveyor is in contact with a conveyor drum supporting or driving the conveyor. For effective scraping the scraper device is loaded to make good contact with the conveyor so that when the scraper device encounters an obstacle that is not easily removed, or even the mechanical fasteners that connect successive lengths of conveyor there is a risk of damage to the scraper device and/or the conveyor.

An object of the invention is to provide a scraper device that obviates or mitigates the risk of damage by disengagement of the scraper device from the conveyor.

According to one embodiment of the present invention there is provided a scraper device for a belt or like conveyor comprising a support unit including an elongate bar on which can be mounted a scraper blade, a framework comprising a pair of longitudinally spaced resiliently loaded slide blocks apertured to rotatably receive the ends of the elongate bar, and a shear connection between the support unit and framework to resist relative rotation therebetween until excessive torque is applied to the scraper blade.

Preferably, each slide block has a circular recess in which is rotatably accommodated a ring into which one end of the elongate bar engages, the slide block and ring having axially-directed registering holes into which is fitted a shear pin.

Also according to the present invention there is provided a scraper device for a belt or like conveyor comprising a support unit for a scraper blade having a pair of longitudinally spaced sleeves, a framework comprising an elongate bar on which the sleeves are rotatably mounted, the sleeves and the bar having registering holes in which are located shear pins which serve to resist rotation of the support unit relative to the framework until excessive torque is applied to the scraper blade.

Preferably, the framework comprises a pair of longitudinally-spaced resiliently-loaded slide blocks apertured non-rotatably to receive the ends of the elongate bar.

Preferably, the scraper blade is carried by the support unit and is constituted by two rows of overlapping blade elements.

Preferably, the rows of blade elements are retained in the support unit by a clamping arrangement at each end.

Preferably, the pressure of the blade on the belt can be varied by means of an adjustment screw which acts on a spring loading each of the slide blocks.

Further according to the invention there is provided an end mounting unit for use in a drum scraper device comprising a bracket of substantially U-configuration with a slide block slidably received between the limbs of the U and being apertured to receive the ends of an elongate bar, and a coil spring supported between an adjustment screw carried by the bracket and a formation on the slide block.

Two embodiments of the invention will now be described with reference to the following drawings, in which:

FIG. 6 is a fragmentary front elevation of a scraper device according to a second embodiment of the invention;

FIG. 7 is a fragmentary plan view of the scraper device shown in FIG. 6;

Figure 1:
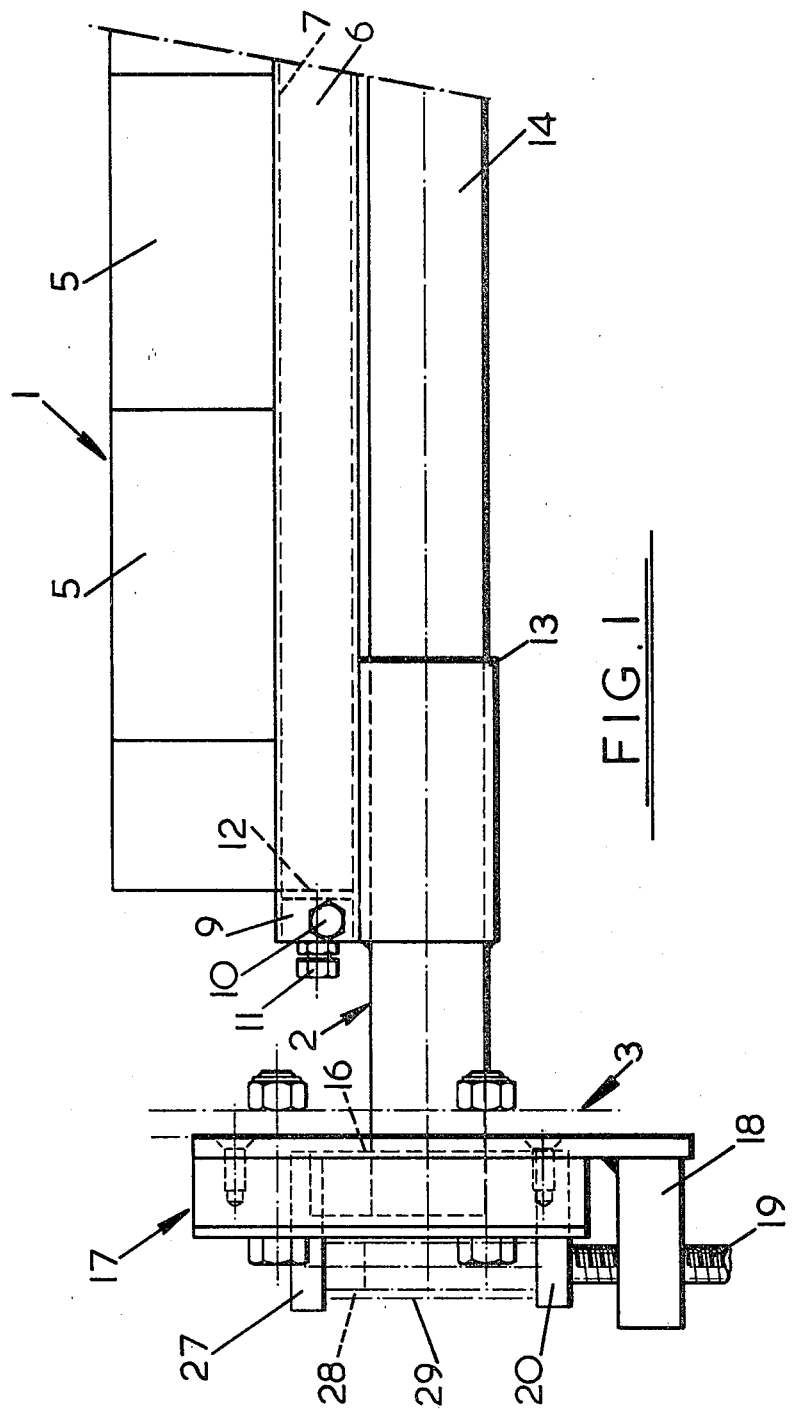
FIG. 1 is a fragmentary front elevation of a scraper device according to a first embodiment of the invention.
Figure 2:
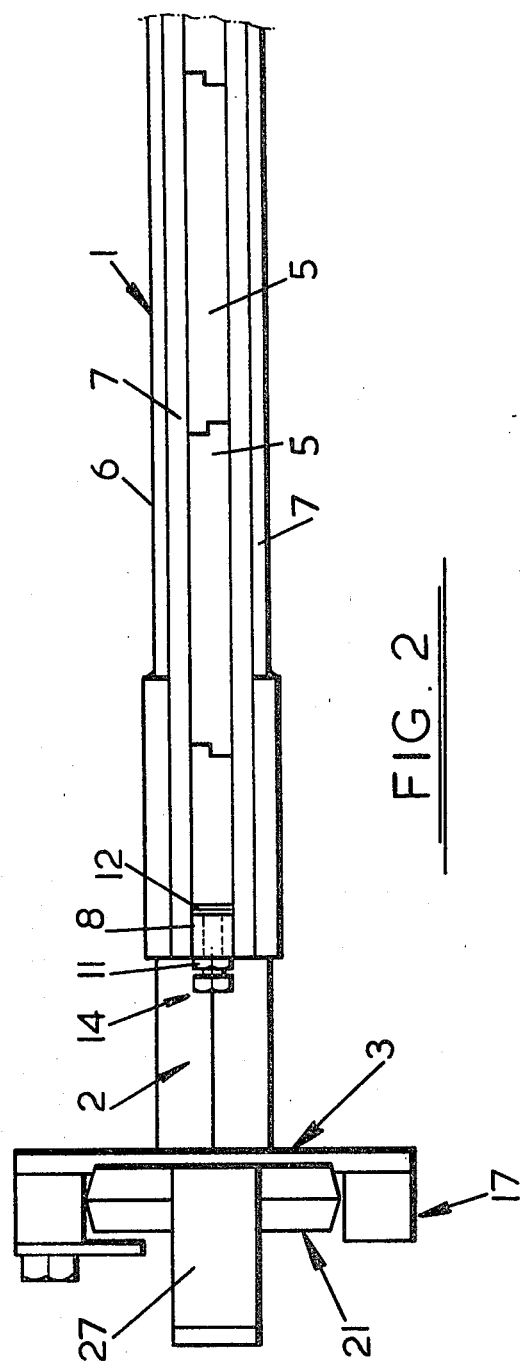
FIG. 2 is a fragmentary plan view of the scraper device shown in FIG. 1.
Figure 3:
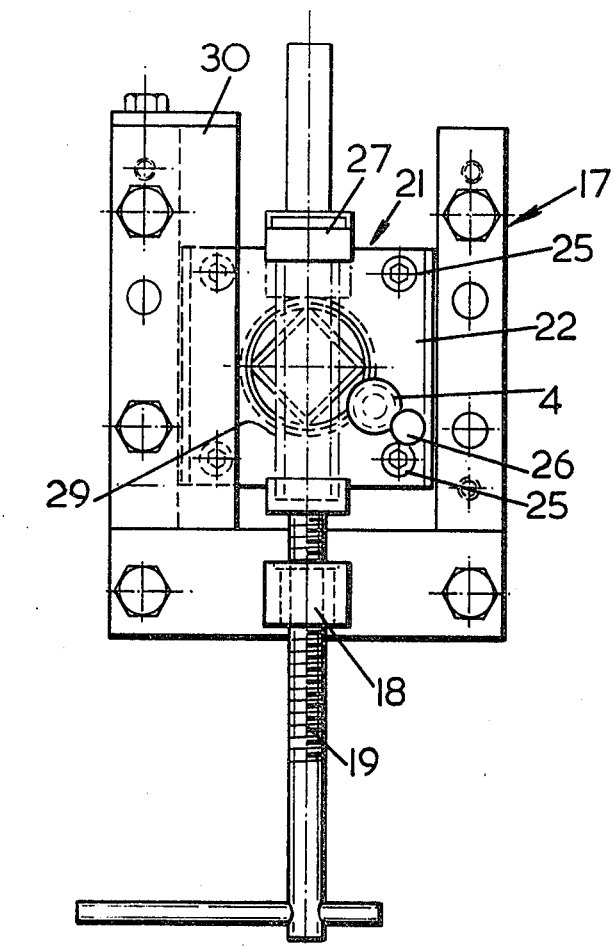
FIG. 3 is an end elevation of the scraper device shown in FIG. 1.
Figure 4:
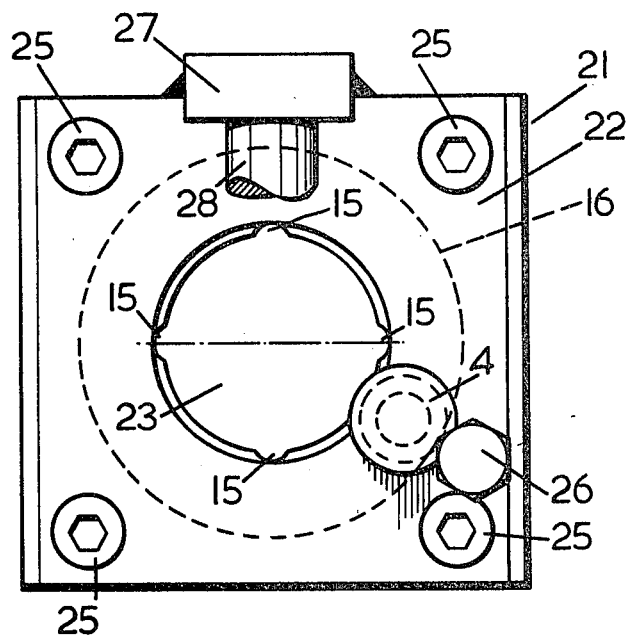
FIG. 4 is an end elevation of a slide block incorporated in the scraper device shown in FIG. 1.
Figure 5:
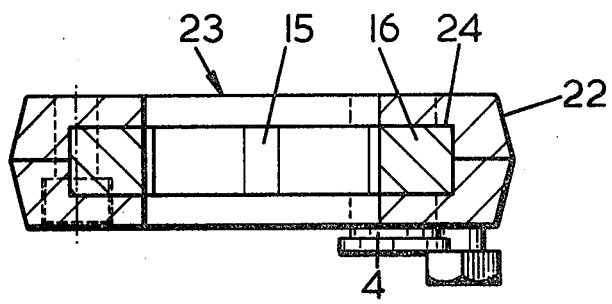
FIG. 5 is a plan view of the slide block shown in FIG. 4.

Referring to FIGS. 1 to 5, the scraper device comprises a scraper blade 1 carried in a support unit 2 pivotally mounted on a supporting framework 3, pivoting of the support unit being normally prevented by a shear pin 4 traversing the support unit 2 and supporting framework 3.

The scraper blade 1 consists of one row of overlapping elements 5 formed of a castable polymeric material such as polyurethane carried in the support unit 2. Each element 5 has two rows of wire inserts (not shown).

The support unit 2 includes an open topped channel member 6 with each limb having an inturned flange 7 between which the blade elements 5 are located. At each end of the channel member 6 is a clamping arrangement for securing the blade elements 5. Each clamping arrangement comprises a bridge piece 8 between flanges 7, a block 9 being secured under this bridge piece by a bolt 10 traversing the limbs of the channel member 6 and the block 9. The latter is traversed by a lockable adjustment bolt 11 normal to and above bolt 9. The bolt acts on a clamping plate 12 abutting the adjacent ends of the blade elements 5.

The support unit 2 also includes longitudinally spaced sleeves 13 welded to the bottom and towards the ends of the channel member 6. An elongate bar 14 of square hollow section is accommodated within and welded to each sleeve 13. Each end of the bar is press fitted into notches 15 on the inside surface of a ring 16 (see especially FIGS. 4 and 5).

The supporting framework 3 includes at each end an end plate 17 of U-configuration both in front elevation and plan view and having extending outwardly from its bottom a bar 18 which receives a threaded adjustment screw 19. The head 20 of the screw has a top depression.

Between both the vertical U-limbs and the horizontal U-limbs of each plate 17 is a slide block 21 comprising a body 22 having a hollow circular aperture 23 which is recessed radially outwards at 24 in order to rotatably accommodate the ring 16. Relative rotation between the slide block 21 and the ring 16, which is part of the support unit 2, is normally prevented by the shear pin 4 which axially extends through aligned holes in the body 22 and the ring 16. The radial recessing of the body 22 is obtained by making it in two parts secured together by bolts 25. Screwed into the body is a retaining bolt 26 whose head overlaps the head of the shear pin 4 and prevents it from accidentally falling out of the body 22.

The body 22 is pointed at its ends which may have a stellite tip to improve wear (see FIG. 2), and contacts the horizontal U-limb. Extending outwardly from the top of the body is a bar 27 from which depends a short rod 28. A coil spring 29 is press fitted at one end of the rod 28 while its other end seats in the depression in the head 20 of the screw 19.

It will be manifest that the slide block 21 floats relative to the end plates 17 and that the blade 1 is consequently loaded by the springs 29 against the conveyor belt. Spring pressure and thus loading are adjustable by means of screws 19.

A plate 30 is bolted to one of the horizontal U-limbs and serves to resist egress of the slide block 21 out of the end plate 17.

Figure 8:
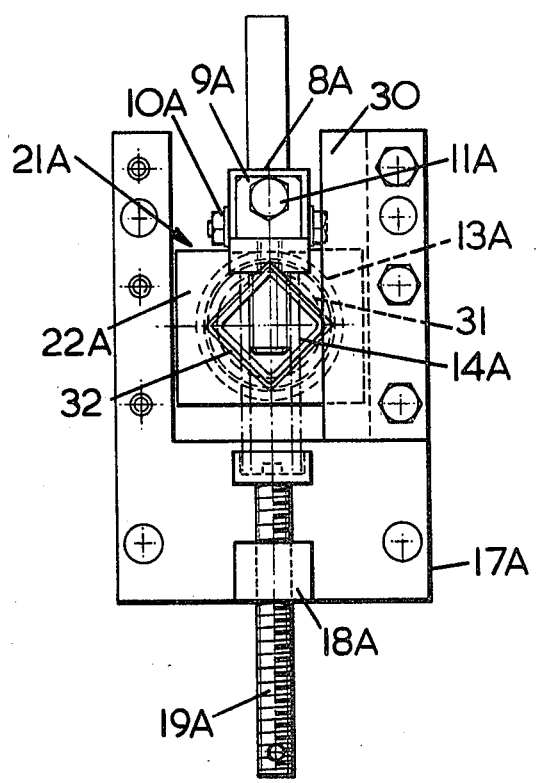
FIG. 8 is an end elevation of the scraper device shown in FIG. 6.

Another embodiment of a scraper device according to the present invention is shown in FIGS. 6 to 8. It is similar to the first embodiment in many respects and the same reference numerals with the addition of the suffix "A" have been used to label common parts.

In this second embodiment the supporting framework 3A includes an elongate bar 14A of square hollow section to which is welded a circular sleeve 31 accommodated within the corresponding sleeve 13A. Relative pivoting between the sleeves 13A and 31 is normally prevented by a shear pin 4A which extends through aligned holes in the sleeves 13A, 31 and the bar 14A.

Between both the vertical U-limbs and the horizontal U-limbs of each end plate 17A is a slide block 21A comprising a one-piece body 22A having a square section hole 32 in which is press fitted the corresponding end of elongate bar 14.

Figure 10:
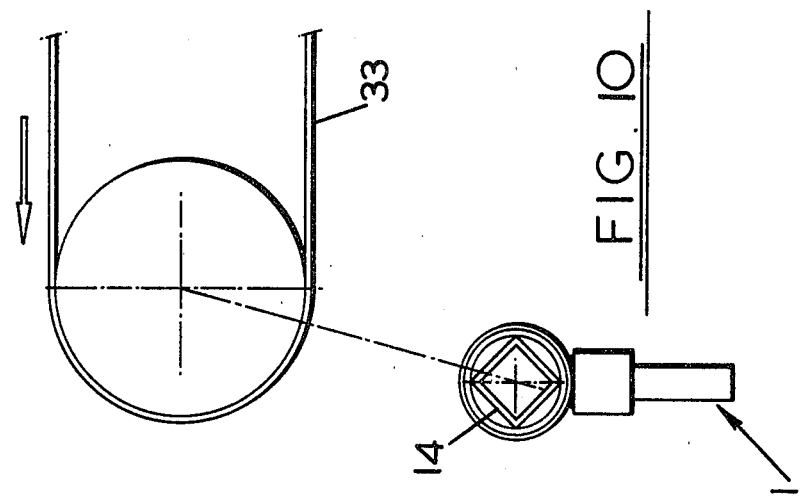
FIG. 10 is a similar view to FIG. 9 but with the device clear of the conveyor belt as a result of the shear connection being broken.
Figure 9:
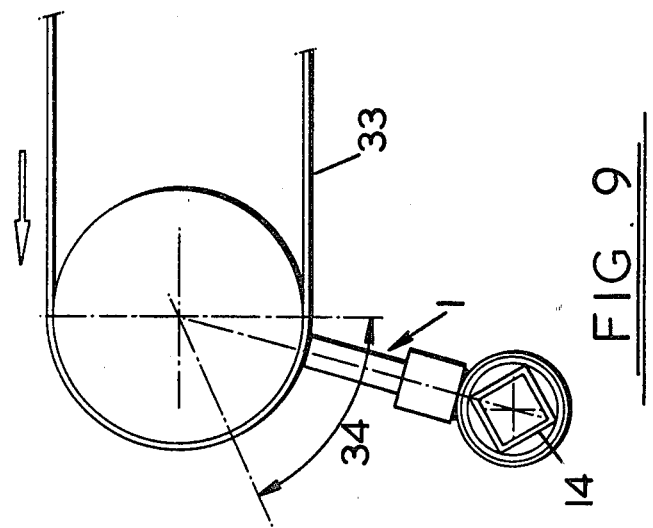
FIG. 9 is a diagrammatic side view of the scraper device operating on a conveyor belt.

FIGS. 9 and 10 show the scraper blade in the operating position with the scraper blade acting on a conveyor belt 33. If the scraper device is subject to a torque beyond a certain limit, for example the blade 1 encountering an obstruction on the belt 33 the shear pin 4 breaks allowing either pivoting of the rings 16 in their apertures 23 in the case of the first embodiment, or pivoting of the sleeves 13A around the sleeves 31 in the case of the second embodiment, thus moving the support unit 2 away from the belt 33 so avoiding damage to either the scraper device or the belt 33.

It is considered that the scraper device of the present invention has the following advantages:

(a) It can be mounted on most types of conveyors with little site work.

(b) It can be mounted radially on a conveyor belt drum between bottom dead centre and any position included in an arc of 75° up the front of the drum (see arrow 34 of FIG. 9).

(c) It may also be mounted tangentially on a conveyor belt drum. An advantage of this arrangement is that the wear life of the blades is improved as both sides of them can be used.

(d) When the blade elements are worn, they can be easily replaced by releasing the clamping arrangements.

(e) The scraper device is very slim in the vertical position and thus stops large build up of fines.

(f) An advantage of the first embodiment is that there is ready access to insert the shear pin.

(g) The clamping arrangements allow the blade to be cut to length on site.

(h) The use of an ordinary coil spring alleviates considerable adjustment.

The scraper devices described so far as intended for heavy duty use.

Scraper devices for light or medium duty need not have an elongate bar and the ends of the channel member can either be located directly in an aperture in the body of the slide block or in the rotatable ring as described in the first embodiment. In the first arrangement the scraper blade is non-rotatable and is only suitable for light duty use. However, a bridge piece attached to the supporting framework extending across the width of the belt on the downstream side of the blade may provide further support to enable the blade to be safely used in medium duty conditions. Another non-rotatable arrangement has the ends of the slide block located directly in an aperture in the body of the slide block.

The blade of the scraper device may make tangential contact with the belt. In this instance when one edge of the blade is worn, the position of the blade can be reversed to allow the other edge to be used.

What is claimed is:

1. A scraper device for a conveyor belt, comprising: a support unit including an elongate bar, a scraper blade mounted on said bar, a framework comprising a pair of longitudinally spaced slide blocks apertured to rotatably receive ends of the elongate bar, means for resiliently loading said slide blocks, and a shear connection between the support unit and framework to resist relative rotation therebetween until excessive torque is applied to the scraper blade.

2. A scraper device as claimed in claim 1, in which each slide block has a circular recess in which is rotatably accommodated a ring into which one end of the elongate bar engages, the slide block and ring having axially-directed registering holes into which said shear connection is fitted.

3. A scraper device as claimed in claim 2, in which the elongate bar is of square section and is press fitted into notches on the inside surface of the ring.

4. A scraper device as claimed in any one of claims 2 or 3 in which each slide block comprises a body having a hollow circular aperture which is recessed radially outwards rotatably to accommodate the ring.

5. A scraper device as claimed in claim 4, in which the slide block body is in two parts bolted together to retain the ring.

6. A scraper device as claimed in claim 4 in which the slide block body and ring have aligned axial holes to accommodate the shear connection, there being a retaining bolt in the body having a head overlapping the shear connection to prevent inadvertent egress of the latter.

7. A scraper device for a conveyor belt, comprising: a support unit for a scraper blade having a pair of longitudinally spaced sleeves, a scraper blade mounted on said support unit, a framework comprising an elongate bar on which the sleeves are rotatably mounted, the sleeves and the bar having registering holes, and shear pins disposed in said holes for resisting rotation of the support unit relative to the framework until excessive torque is applied to the scraper blade.

8. A scraper device as claimed in claim 7 in which the elongate bar has fast thereon a pair of sleeves each of which is rotatably surrounded by a support unit sleeve, the shear pins traversing registering holes in both sleeves and the elongate bar.

9. A scraper device as claimed in claim 7, in which the framework comprises a pair of longitudinally-spaced resiliently-loaded slide blocks apertured non-rotatably to receive the ends of the elongate bar.

10. A scraper device as claimed in claims 1 or 9, in which each slide block is slidably received in a bracket of substantially U-configuration of the framework, the slide block sliding between the limbs of the U-bracket with a coil spring supported between an adjustment screw carried by the U-bracket and a formation on the slide block.

11. A scraper device as claimed in claim 10 in which the slide block is pointed at its bracket-contacting ends.

12. A scraper device as claimed in claim 10 or 11 in which a slide block retaining plate is provided on each bracket.

13. A scraper device as claimed in claims 1 or 7, wherein the scraper blade comprises two rows of overlapping blade elements carried by the support unit.

14. A scraper device as claimed in claim 13 in which the rows of blade elements are retained in the support unit by a clamping arrangement at each end.

* * * * *